United States Patent
Bakin et al.

(10) Patent No.: US 9,252,835 B2
(45) Date of Patent: Feb. 2, 2016

(54) TIME-PHASE-HOPPING MODULATION AND DEMODULATION OF MULTIPLE BIT STREAMS WITH PHASE-CHANGE FREQUENCY CONTROL, SUCH AS FOR WIRELESS CHIP AREA NETWORK

(75) Inventors: Eugine Bakin, Saint-Petersburg (RU); Maksim Grankin, Saint-Petersburg (RU); Grigory Evseev, Saint-Petersburg (RU); Andrey Turlikov, Saint-Petersburg (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/350,748

(22) PCT Filed: Apr. 27, 2012

(86) PCT No.: PCT/RU2012/000338
§ 371 (c)(1),
(2), (4) Date: Oct. 16, 2014

(87) PCT Pub. No.: WO2013/162403
PCT Pub. Date: Oct. 31, 2013

(65) Prior Publication Data
US 2015/0043619 A1    Feb. 12, 2015

(51) Int. Cl.
*H04B 1/00* (2006.01)
*H04B 1/692* (2011.01)
*H04B 1/69* (2011.01)
*H04B 14/02* (2006.01)

(52) U.S. Cl.
CPC ............. *H04B 1/692* (2013.01); *H04B 1/69* (2013.01); *H04B 14/026* (2013.01); *H04B 2001/6908* (2013.01)

(58) Field of Classification Search
CPC ............. H04B 1/692; H04B 14/026; H04B 2001/026; H04B 1/69
See application file for complete search history.

(56) References Cited

U.S. PATENT DOCUMENTS

| | | | |
|---|---|---|---|
| 6,516,037 B1* | 2/2003 | Wei | H03M 13/098 375/264 |
| 7,616,706 B2 | 11/2009 | Koslov | |
| 2004/0257167 A1* | 12/2004 | Kim et al. | 332/112 |
| 2005/0100100 A1* | 5/2005 | Unger | 375/240.27 |
| 2007/0025283 A1* | 2/2007 | Koslov | 370/316 |
| 2008/0279287 A1* | 11/2008 | Asahina | H04B 1/69 375/242 |
| 2010/0195668 A1* | 8/2010 | Robert et al. | 370/475 |

OTHER PUBLICATIONS

International Search Report and Written Opinion Received for PCT Patent Application No. PCT/RU2012/000338, mailed on Jan. 24, 2013.

* cited by examiner

*Primary Examiner* — Syed Haider
(74) *Attorney, Agent, or Firm* — Garrett IP, LLC

(57) ABSTRACT

Methods and systems to modulate and demodulate first and second path bits within sequences of pulses, where each pulse represents first and second path bits and is position-modulated and phase-modulated based on binary values of the corresponding bits, with no more than 1 phase change per N pulses. Position-modulation may be based on first-path bits. Phase-modulation may be based on second-path bits. A modulator first path has an input data rate Q times that of a second path. The first may include an N-bit encoder. The second path may include a Q-bit encoder and an N-bit repetition encoder. A demodulator includes a first path to determine first path bit values based on pulse coordinates integrated over N frames, and a second path to determine second path bit values based on further integration over Q frames.

16 Claims, 12 Drawing Sheets

FIG. 10

First Bit Path Values:

| Bit | $b_1$ | | | $b_2$ | | | $b_4$ | | | $b_5$ | | |
|---|---|---|---|---|---|---|---|---|---|---|---|---|
| Bit Value | 1 | | | 1 | | | 0 | | | 1 | | |
| PN (N,1) Codes | 101 | | | 100 | | | 111 | | | 001 | | |
| PN (N,1) Encoded Values | 1⊕{101}→010 | | | 1⊕{100}→011 | | | 0⊕{111}→111 | | | 1⊕{001}→110 | | |
| $f^{<1>}$ Values | $f^{<1>}_1$ | $f^{<1>}_2$ | $f^{<1>}_3$ | $f^{<1>}_4$ | $f^{<1>}_5$ | $f^{<1>}_6$ | $f^{<1>}_7$ | $f^{<1>}_8$ | $f^{<1>}_9$ | $f^{<1>}_{10}$ | $f^{<1>}_{11}$ | $f^{<1>}_{12}$ |
| | 0 | 1 | 0 | 0 | 1 | 1 | 1 | 1 | 1 | 1 | 1 | 0 |

FIG. 11

Second Bit Path Values:

| Bit | $b_3$ | | | | | | $b_6$ | | | | | |
|---|---|---|---|---|---|---|---|---|---|---|---|---|
| Bit Value | 0 | | | | | | 0 | | | | | |
| PN (Q,1) Codes | 10 | | | | | | 01 | | | | | |
| PN (Q,1) Encoded Values | 0⊕{10}→10 | | | | | | 0⊕{01}→01 | | | | | |
| Rep. Enc. Values | 111 | | | 000 | | | 000 | | | 111 | | |
| $f^{<2>}$ Values | $f^{<2>}_1$ | $f^{<2>}_2$ | $f^{<2>}_3$ | $f^{<2>}_4$ | $f^{<2>}_5$ | $f^{<2>}_6$ | $f^{<2>}_7$ | $f^{<2>}_8$ | $f^{<2>}_9$ | $f^{<2>}_{10}$ | $f^{<2>}_{11}$ | $f^{<2>}_{12}$ |
| | 1 | 1 | 1 | 0 | 0 | 0 | 0 | 0 | 0 | 1 | 1 | 1 |

FIG. 12

| Frame | 1 | 2 | 3 | 4 | 5 | 6 | 7 | 8 | 9 | 10 | 11 | 12 |
|---|---|---|---|---|---|---|---|---|---|---|---|---|
| Bit Pair | $f^{<1>}_1$, $f^{<2>}_1$ | $f^{<1>}_2$, $f^{<2>}_2$ | $f^{<1>}_3$, $f^{<2>}_3$ | $f^{<1>}_4$, $f^{<2>}_4$ | $f^{<1>}_5$, $f^{<2>}_5$ | $f^{<1>}_6$, $f^{<2>}_6$ | $f^{<1>}_7$, $f^{<2>}_7$ | $f^{<1>}_8$, $f^{<2>}_8$ | $f^{<1>}_9$, $f^{<2>}_9$ | $f^{<1>}_{10}$, $f^{<2>}_{10}$ | $f^{<1>}_{11}$, $f^{<2>}_{11}$ | $f^{<1>}_{12}$, $f^{<2>}_{12}$ |
| Bit Pair Values | {01} | {11} | {01} | {00} | {10} | {10} | {10} | {10} | {10} | {11} | {11} | {01} |

US 9,252,835 B2

TIME-PHASE-HOPPING MODULATION AND DEMODULATION OF MULTIPLE BIT STREAMS WITH PHASE-CHANGE FREQUENCY CONTROL, SUCH AS FOR WIRELESS CHIP AREA NETWORK

BACKGROUND

Data rates within and amongst integrated circuits, multi-chip systems, and systems-on-a-chip (SoC), are being pushed to limits of conventional electrical communication channels and interconnections. This may lead to signal attenuation and distortion in electrical channels due to skin effect, dielectric absorption, and/or impedance mismatches.

Wireless radio-frequency (RF) interconnects are being explored, also referred to as wireless chip area networks (WCANs), to provide wireless interconnects within a chip (intra-chip) or amongst multiple chips (inter-chip).

A WCAN may be implemented with pulse-position or time-hopping spread spectrum modulation (TH-SS), where a data value is modulated as a pulse having one of multiple positions within a corresponding times slot based on the data value.

TH-SS data transfer rates may be increased with phase-shifting. Due to area and power consumption concerns, however, a WCAN transceiver may have limited phase shift agility.

BRIEF DESCRIPTION OF THE DRAWINGS/FIGURES

FIG. 10 is a table of example bit values for a first bit path of the system of FIG. 8.

FIG. 11 is a table of example bit values for a second bit path of the system of FIG. 8.

FIG. 12 is table of paired bit values from the tables of FIGS. 10 and 11, to be modulated as a sequence of corresponding pulses having phase offsets and pulse positions based on values of the corresponding bit pair.

Figure 1:
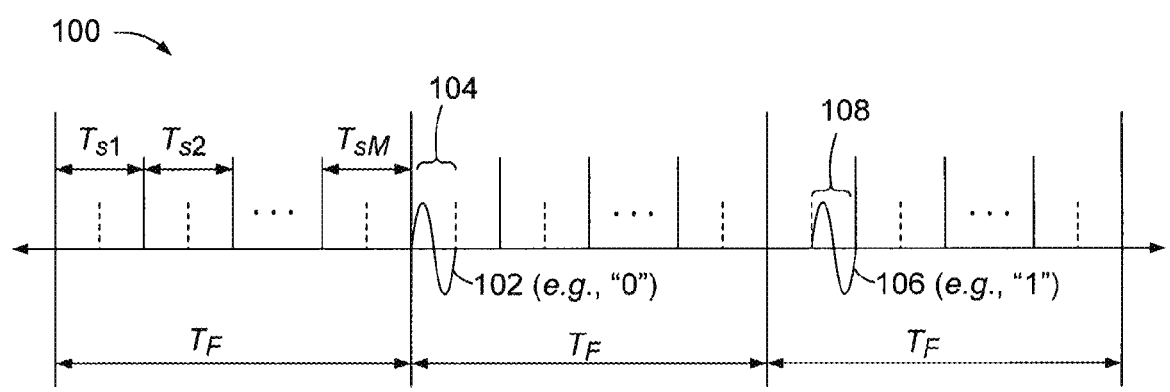
FIG. 1 is timing diagram of time-hopping or pulse-position-hopping spread spectrum modulation.

In the drawings, the leftmost digit(s) of a reference number identifies the drawing in which the reference number first appears.

DETAILED DESCRIPTION

Methods and systems disclosed herein may be implemented in wireless chip area networks and/or other wireless network(s).

FIG. 1 is timing diagram 100 of time-hopping spread spectrum or pulse-position-hopping spread spectrum modulation, having time frames $T_F$, each including M time slots $T_S$.

A bit first value, such as a logic value 0, may be transmitted as a pulse within a first portion of a corresponding time slot, such as pulse 102 within time slot portion 104. A bit value of 1 may be transmitted as a pulse within a second portion of another time slot, such as pulse 106 within time slot portion 108.

Pulses 102 and 104 may have the same duration, illustrated here as $\tau = T_S/2$, and may have the same phase.

Time slots $T_S$ may be allotted amongst multiple transmitters, such as in an inter-chip communication system. A $k^{th}$ transmitter signal, k, may be expressed as:

$$s_k(t) = \sum_j s_{pls}\left(t - jT_F - c_j^{<k>}T_s - d_j^{<k>}\right) \quad \text{EQ. (1)}$$

In EQ. (1), $s_{pls}$ represents an ultra-wideband monocycle pulse, j represents a number of pulses in a sequence, $c_j^{<k>}$ represents a time slot of a time frame, $d_j^{<k>}$ and represents a time shift within the time slot, which distinguishes between bit values 0 and 1.

Bit values may be encoded with pseudo-random (PN) sequences of bits of length N>1, such as to reduce inter-symbol interference and/or cross-talk. A bit value of 0 may be encoded as an N-bit PN sequence, and a bit value of 1 may be encoded as an inverted N-bit PN sequence. For example, a bit value of 0 encoded with a 3-bit PN sequence of 101 may be expressed as 0⊕(101)=101, and a bit value of 1 encoded with the 3-bit PN sequence of 101 may be expressed as 1⊕{101}=010. Such an encoding technique is referred to herein as PN (N,1) encoding. The N-bit PN sequence may be changed for each bit to be transmitted.

Figure 2:
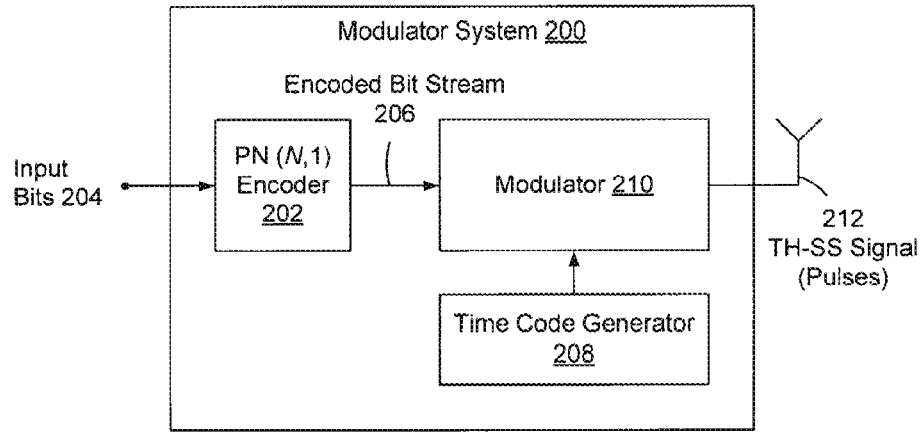
FIG. 2 is a block diagram of a modulator system to encode and modulate bits with time-hoping spread spectrum (TH-SS) modulation.

FIG. 2 is a block diagram of a modulator system 200 to encode and modulate bits with time-hoping spread spectrum (TH-SS) modulation. System 200 includes a PN (N,1) encoder 202 to encode bits 204 with PN (N,1) sequences and output an encoded bit stream 206. System 200 further includes a time code generator 208 to control a modulator 210 to modulate encoded bit stream 206 as TH-SS pulses 212, such as described above with reference to FIG. 1.

Figure 3:
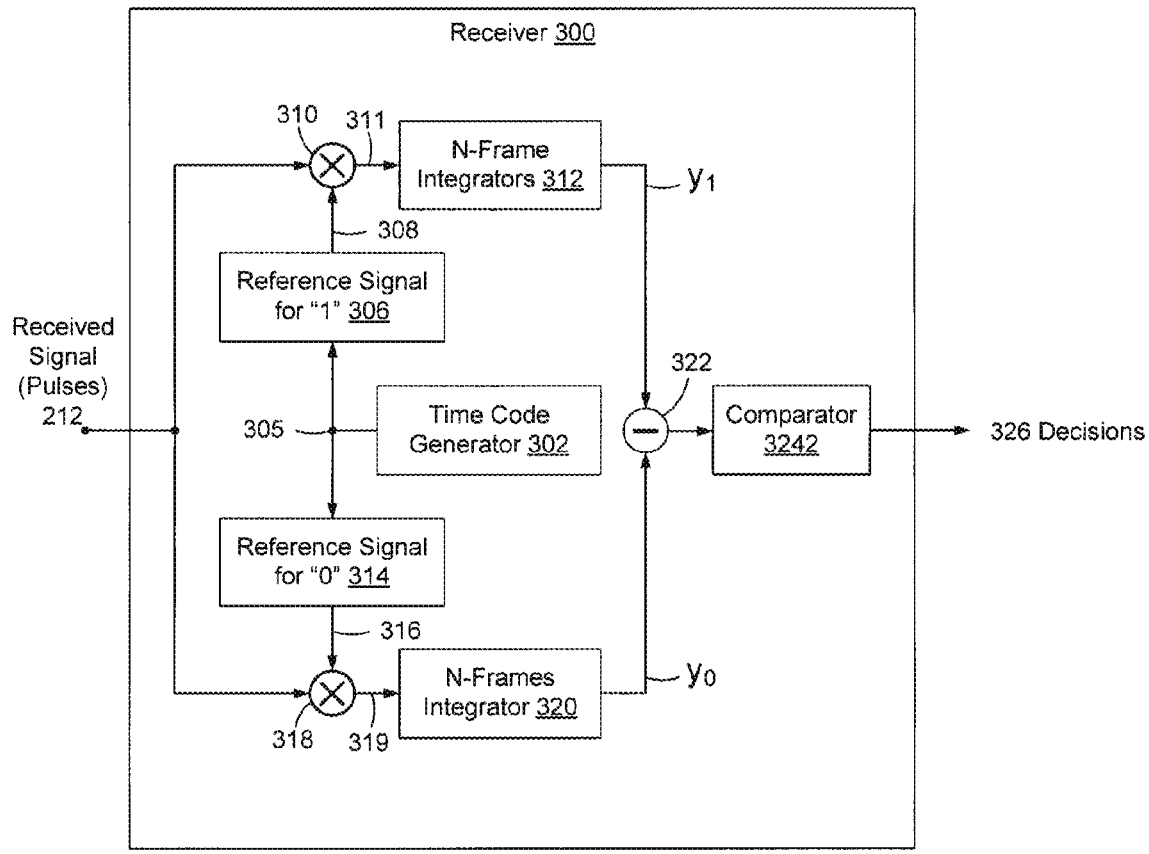
FIG. 3 is a block diagram of a demodulator system to decode and demodulate bits from a TH-SS modulated signal.

FIG. 3 is a block diagram of a demodulator system 300 to decode and demodulate a TH-SS signal. System 300 is described below with reference to TH-SS signal 212 of System 200 in FIG. 2.

System 300 includes first and second multipliers, mixers, or samplers (multipliers) 310 and 318 to generate corresponding values 311 and 319 based on reference signals 308 and 316 and control reference signals 308 and 316.

System 300 further includes first and second reference signal generators 306 and 314 to control reference signals 308 and 316 based on a timing signal 305.

First reference signal generator 306 controls first reference signal 308 to correspond to a logic value 1. Second reference signal generator 314 controls second reference signal 318 to correspond to a logic value 0. In other words, when a pulse of signal 212 corresponds to a logic value 1, value 311 is greater than value 319. When a pulse of signal 212 corresponds to a logic value 0, value 319 is greater than value 311.

System 300 further includes a time-code generator 302 to control timing signal 305. Time code generator 302 may control timing signal 305 based on the N-bit sequences applied by encoder 202 so that signals 311 and 319 represent decoded values. System 300 may, for example, include a pseudo-random number generator similar or identical to encoder 202 of system 200, to replicate the N-bit sequences applied by encoder 202, or to generate an inverse of the N-bit sequences.

In an embodiment, time code generator 302 is time-synchronized with time code generator 208 to provide reference signals 308 and 316 to corresponding multipliers 310 and 318 at appropriate times. In an embodiment, system 300 synchronizes reference signals with received signal 212 to calculate correlation coefficients.

In an embodiment, system 300 further synchronizes with respect to PN codes applied by system 200 to permit system 300 to decode the PN codes. In an embodiment, system 300 synchronizes a value of signal 305 with PN codes applied by encoder 202.

System 300 further includes first and second N-frame integrators 312 and 320, each to integrate corresponding values 311 and 319 over a moving window N of transmit frames and to output corresponding coordinates $y_1$ and $y_2$, such as described below with reference to FIGS. 15 through 19.

System 300 further includes a subtractor 322 to determine differences between coordinates $y_1$ and $y_2$, and comparator 324 to generate decisions 326 regarding input bits 204 of system 200 based on the differences. Comparator 322 may be implemented to compute correlation coefficients with etalon sequences representing 1 and 0.

A data rate of a TH-SS modulated signal with PN (N,1) encoding may expressed as:

$$R_b = \frac{1}{T_F N} \text{ bits per second, or} \qquad \text{EQ. (2)}$$

$$R_b = \frac{1}{MN} \text{ bits per time slot.} \qquad \text{EQ. (3)}$$

Higher data rates may be provided with phase shifting as described below.

FIGS. 4 through 7 are timing diagrams of pulses 402, 502, 602, and 702, respectively. Pulses 402 and 602 are each positioned within a second portion of respective time slots Ts 404 and 604, and pulses 502 and 702 are each positioned within a first portion of respective time slots Ts 504 and 704. Pulses 402 and 502 are in-phase with one another, pulses 602 and 702 are in phase with one another, and pulses 402 and 502 are 180 degrees out-of-phase with pulses 602 and 702.

Pulses 402, 502, 602, and 702 may each be associated with a corresponding logic state or value. Logic values may be assigned based on a two-bit Gray code, or reflected binary code, where two successive values differ by one bit. In the examples of FIGS. 4 through 7, pulses 402, 502, 602, and 702 are identified with bit values {10}, {00}, {01}, and {11}, respectively.

Figure 4:
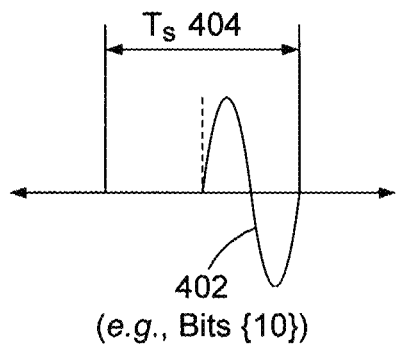
FIG. 4 is a timing diagram of a pulse having one of multiple selectable phase shifts or offsets, and one of multiple positions within a time slot.
Figure 5:
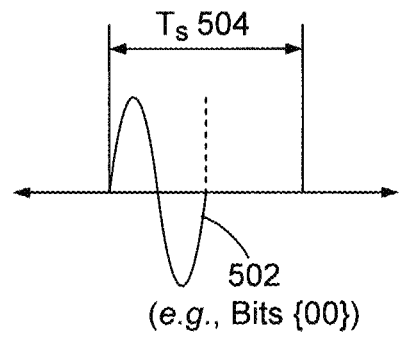
FIG. 5 is a timing diagram of another pulse having one of multiple selectable phase shifts and positions.

Methods and system disclosed herein are not limited to the example of FIG. 4. For example, time slots may be divided into more than two portions, more than two phases may be implemented, and/or other logic values may be associated with each combination of a time-slot position and a phase.

In the examples of FIGS. 4 through 7, a phase change occurs only upon a change in the right-hand bit. This feature may be incorporated into a time-phase-hopping modulation technique to control a frequency of phase-shifts, referred to herein as time-phase-hopping modulation with controlled phase hops. Time-phase-hopping modulation with controlled phase hops may be useful, for example, in an environment where frequent phase shifts are undesirable and/or impractical, and may be useful, for example, in an inter-chip or intra-chip wireless chip area network.

Figure 8:
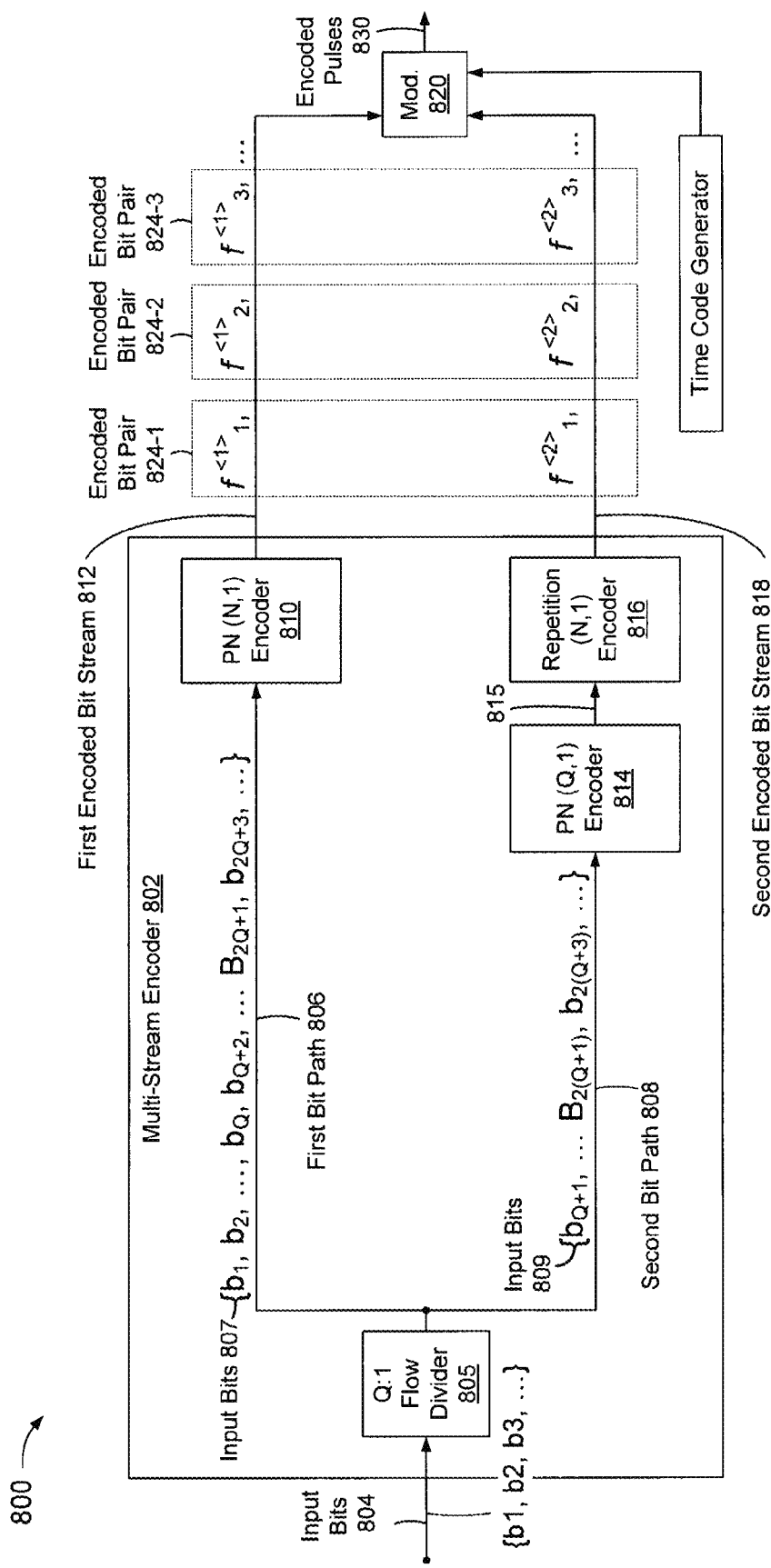
FIG. 8 is a block diagram of a multi-bit-stream modulator system to combine multiple bit streams as a sequence of pulses, and to modulate positions and phases of the pulses based on corresponding bit values.

FIG. 8 is a block diagram of a multi-bit-stream modulator system 800 to combine multiple bit streams as a sequence of pulses, and to modulate positions and phases of the pulses based on corresponding bit values. System 800 may be implemented to provide controlled phase hops or phase changes.

System 800 includes a multi-stream encoder 802 having first and second encoder streams or bit paths 806 and 808, each to receive corresponding input bits 807 and 809.

System 800 further includes a flow divider 805 to divide or apportion input bits 804 amongst first and second bit paths 806 and 808 based on a repetitive pattern. In the example of FIG. 8, flow divider 805 is implemented to apportion Q bits to first bit path 806 for each bit apportioned to second bit path 808, where Q is a positive number. An input bit rate of first bit path 806 is Q times the input bit rate of second bit path 808. Flow divider 805 is referred to herein as a Q:1 flow divider.

First bit path 806 includes a N-bit encoder, illustrated here as an N-bit pseudo-random number (PN (N,1)) encoder. Encoder 810 encodes input bits 807 with N-bit PN sequences, to provide a first encoded bit stream 812, $\{f^{<1>}_1, f^{<1>}_2, \text{ and } f^{<1>}_3 \ldots\}$.

Second bit path 808 includes a Q-bit encoder 814, illustrated here as a Q-bit pseudo-random number (PN (Q,1)) encoder. Encoder 814 encodes input bits 809 with Q-bit PN sequences, where Q is a positive number.

Second bit path 808 further includes an N-bit repetition encoder 816 to replicate encoded bits 815 of second bit path 808 to provide a second encoded bit stream 818 $\{f^{<2>}_1, f^{<2>}_2,$ and $f^{<2>}_3 \ldots\}$, having a one-to-one bit correlation with, or a bit-rate equal to first bit stream 812.

System 800 further includes a modulator 820 to modulate pairs 824 of encoded bits as a sequence of pulses with positions and phases modulated based on binary values of the corresponding bit pair, such as described above with reference to FIGS. 4 through 7.

As described above position modulation may be based on bits of first encoded bit stream 812, and phase modulation may be based on bits of second encoded bit stream 818. As illustrated in examples below, repetition encoder 816 limits phase changes to no more than 1 phase change for N transmit frames.

Figure 9:
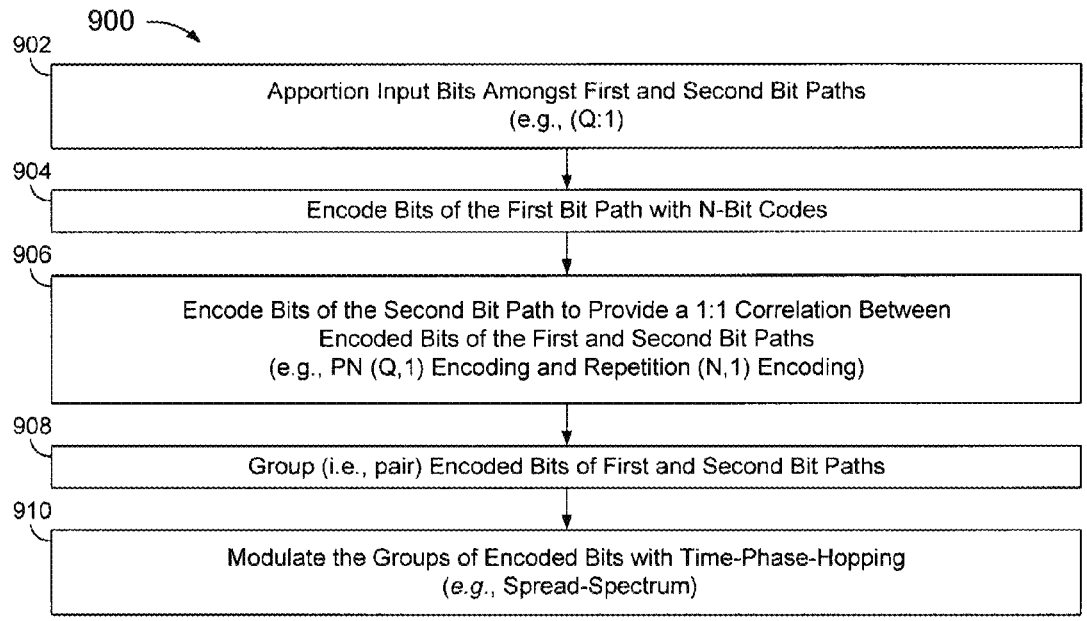
FIG. 9 is a flowchart of a method of combining multiple bit streams as a sequence of pulses, and modulating positions and phases of the pulses based on corresponding bit values.

FIG. 9 is a flowchart of a method 900 of combining multiple bit streams as a sequence of pulses, with positions and phases modulated based on corresponding bit values. Method 900 is described below with respect to example bit values provided in Table 1 below and example parameters values N=3 and Q=2, and with reference to FIGS. 8 and 10 through 13.

Method 900 is not, however, limited to these examples.

TABLE 1

| Bit | $b_1$ | $b_2$ | $b_3$ | $b_4$ | $b_5$ | $b_6$ |
|---|---|---|---|---|---|---|
| Bit Value | 1 | 1 | 0 | 0 | 1 | 0 |

At 902, a sequence or stream of input bits are divided or apportioned amongst first and second bit paths, such as described above with reference to flow divider 805 in FIG. 8.

FIGS. 10 and 11 are tables of values for first and second bit paths, respectively, for the example above. In FIG. 10, bits b1, b2, b4, and b5 (bit values {1101}), are directed to a first bit path, such as first bit path 806 in FIG. 8. In FIG. 11, bits b3 and b6 (bit values {00}), are directed to a second bit, such as second bit path 808 in FIG. 8.

At 904, bits of the first bit path are encoded with N-bit codes, such as N-bit PN codes.

FIG. 10 provides example PN (N,1) codes of {101}, {100}, {111}, and {001}. Also in FIG. 10, PN (N,1) encoding of bits b1, b2, b4, and b5 is represented as 1⊕{101}, 1⊕{100}, 0⊕{111}, 1⊕{001}, respectively, which provides encoded bit values of:

$f^{<1>}_1, f^{<1>}_2, \ldots f^{<2>}_{12}$=010011111110.

At 906, bits of the second bit path are encoded to provide a 1:1 correlation between encoded bits of the first and second bit paths. Second bit path encoding may include PN (Q,1) encoding FIG. 11 provides example PN (Q,1) codes of {10} and {01}. Corresponding PN (Q,1) encoding of bits b3 and b4 is represented as 0⊕{10}, 0⊕{01}, which provides encoded bit values of 1001. Repetition encoding of {1001}, for (N=3), provides:

$f^{<2>}_1, f^{<2>}_2, \ldots f^{<2>}_{12}$=111000000111.

At 908, encoded bits of the first and second bit paths are grouped and assigned to transmit time frames. FIG. 12 is table of grouped bit values for the example above.

Figure 13:
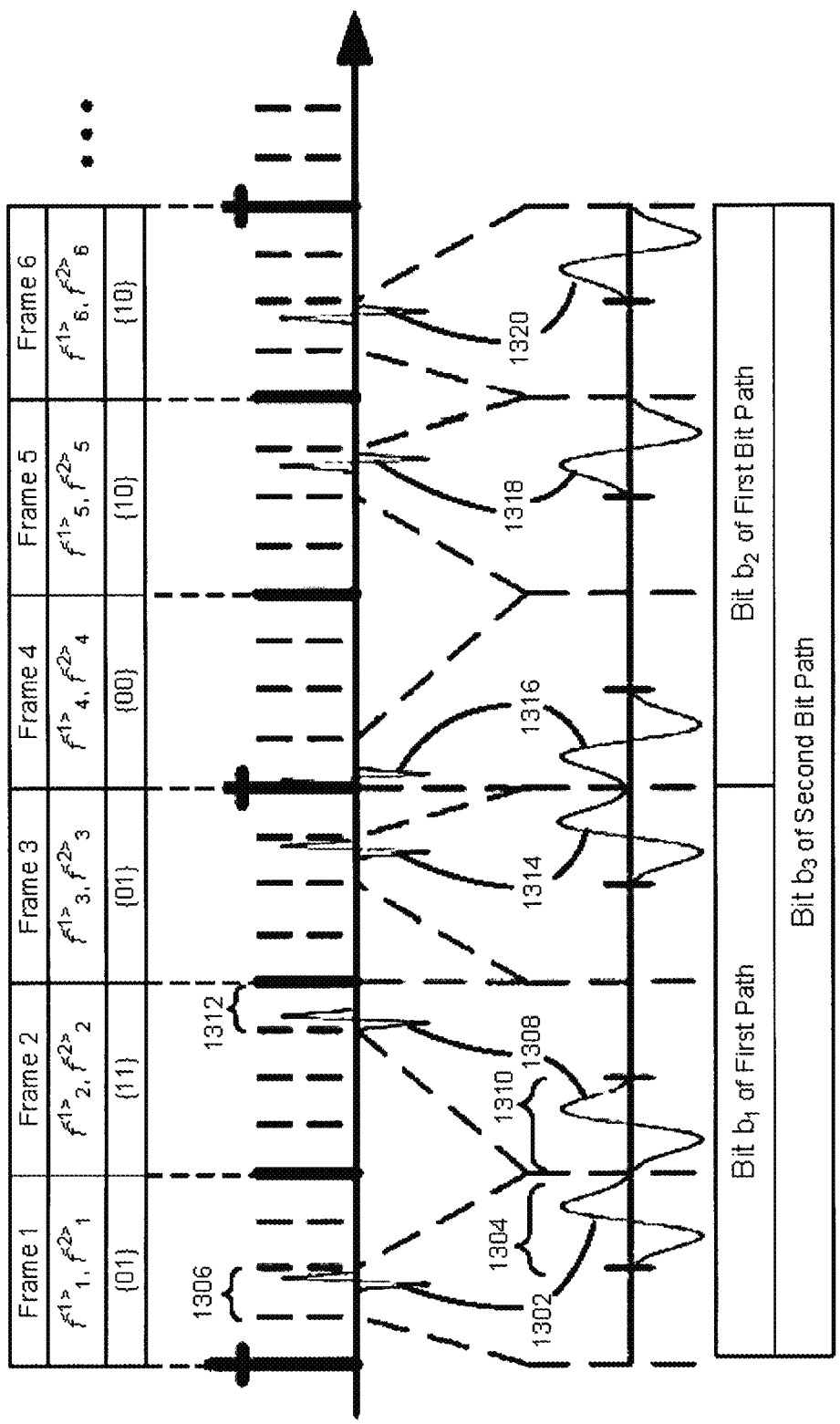
FIG. 13 is a diagram of paired bit values of FIG. 12, superimposed over a timing diagram of corresponding modulated pulses.

At 910, the encoded bit pairs are modulated as a sequence or stream of corresponding pulses, with positions and phases modulated based on FIG. 13 is a diagram of paired bit values $\{f^{<1>}_1, f^{<2>}_1\}, \{f^{<2>}_2, f^{<2>}_2\}, \{f^{<1>}_3, f^{<2>}_3\} \ldots \{f^{<1>}_6, f^{<2>}_6\}$ of FIG. 12, and corresponding modulation pulses.

Figure 6:
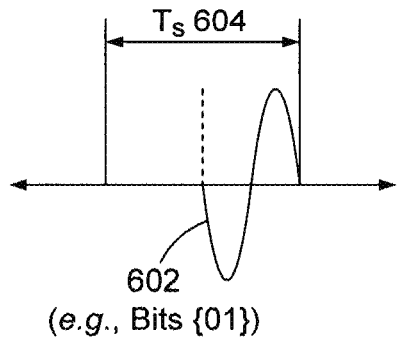
FIG. 6 is a timing diagram of another pulse having one of multiple selectable phase shifts and positions.
Figure 7:
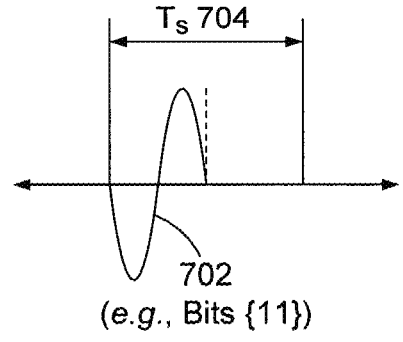
FIG. 7 is a timing diagram of another pulse having one of multiple selectable phase shifts and positions.

In FIG. 13, bit pair $\{f^{<1>}_1, f^{<2>}_1\}$, having bit values {01}, is represented as a pulse 1302 within a second portion 1304 of a time slot 1306 of time frame 1, similar to pulse 602 in FIG. 6. Bit pair $\{f^{<1>}_2, f^{<1>}_2\}$, having bit values {11}, is represented as a pulse 1308 during a first portion 1310 of a time slot 1312 of time frame 2, similar to pulse 702 in FIG. 7. Similarly, pulses 1314, 1316, 1318, and 1320, correspond to pulses 602, 502, 402, and 402, in respective FIGS. 6, 5, 4, and 4.

As illustrated in FIG. 13, bit b1 of first bit path 806 is transmitted over frames 1, 2, and 3, bit b2 of first bit path 806 is transmitted over frames 4, 5, and 6, and bit b3 of second bit path 808 is transmitted over frames 1 through 6.

In addition, bits b1 and b2 are pulse-position modulated, while bit b3 is phase modulated.

As described further above, repetition encoder 816 provides sequences of N identical bits within second encoded bit stream 818. Where, as here, second encoded bit stream 818 is modulated with phase modulation, the sequences of N repetitive bits limits phases changes to no more than one per N transmit frames. In FIG. 13, for example, there is one phase change over transmit frames 1-6, between pulses 1314 and 1316.

A data rate of encoded pulses 830 in FIG. 8 may be expressed as:

$$R_b = \frac{Q+1}{T_F Q N} \text{ bits per second,} \qquad \text{EQ. (4)}$$

which is times greater than the data rate of EQ. (2).

In EQ. (4), a maximum data rate may be attained with Q=1, which provides first and second bit paths 806 and 806 with equal input data rates. As described below, setting Q to greater than 1 may help to distribute errors, or bit error rate, amongst first and second bit paths 806 and 808.

Figure 14:
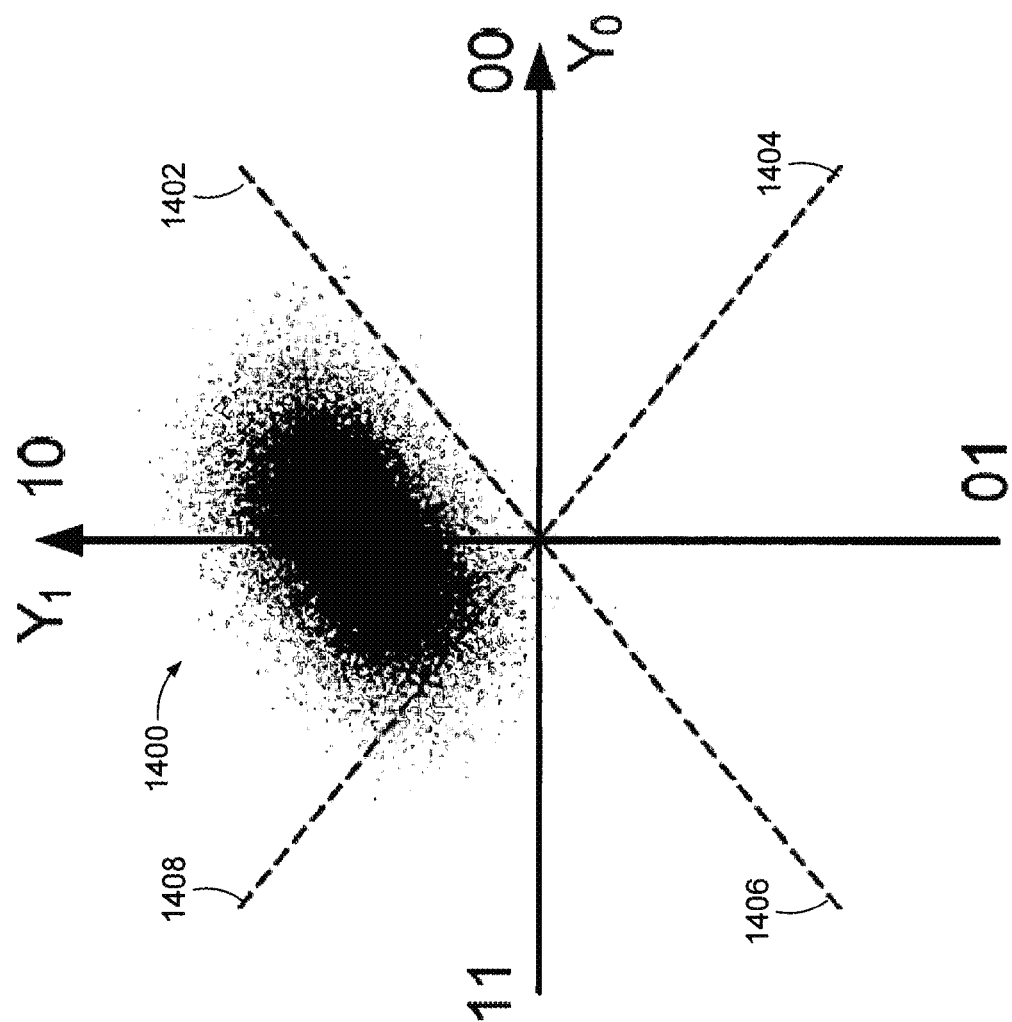
FIG. 14 is a graph of a 2-dimensional distribution of points of a time-phase-hopping spread-spectrum signal having multi-stream encoding and a 1:1 division of bits between first and second encoding streams.

FIG. 14 is a graph of a 2-dimensional (2D) distribution of points 1400 for a time-phase-hopping spread-spectrum signal having multi-stream encoding and a 1:1 division of bits between first and second encoding streams (e.g., system 800 in FIG. 8 with Q=1). Points 1400 may represent correlator outputs of a receiver.

Points 1400 may be determined to represent {00}, {01}, {10}, or {11} depending upon on an area in which points 1400 lie. In FIG. 14, the left-hand bits correspond to input bits 807 of first bit path 806, and the right-hand bits correspond to input bits 809 of second bit path 808 in FIG. 8.

Also in FIG. 14:

an area bounded by lines 1402 and 1404 corresponds to {00};

an area bounded by lines 1404 and 1406 corresponds to {01};

an area bounded by lines 1406 and 1408 corresponds to {11}; and an area bounded by lines 1408 and 1402 corresponds to {10}.

Points 1400 lie primarily within the area bounded by lines 1408 and 1402, which corresponds to {10}, while a portion of points 1400 lie within the area bounded by line 1406 and 1408, which corresponds to {11}. In selecting between {10} and {11}, an error in the second bit may be more likely than an error in the right-hand bit. The bit error rate may be distributed more-equitably amongst the right and left-hand bits for Q>1.

Returning to FIG. 8, encoder 810 and/or encoder 814 may be omitted from system 800. For example, encoder 810 and encoder 814 may be omitted, Q:1 flow divider 802 may be implemented for Q>1, and repetition encoder 816 may be implemented to provide N=Q repetition encoding. As another example, encoder 814 may be omitted, Q:1 flow divider 802 may be implemented for Q>0, and repetition encoder 816 may be implemented to provide Q*N repetition encoding. Methods and systems disclosed herein are not, however, limited to these examples.

Multi-bit-stream demodulation is now described.

Figure 15:
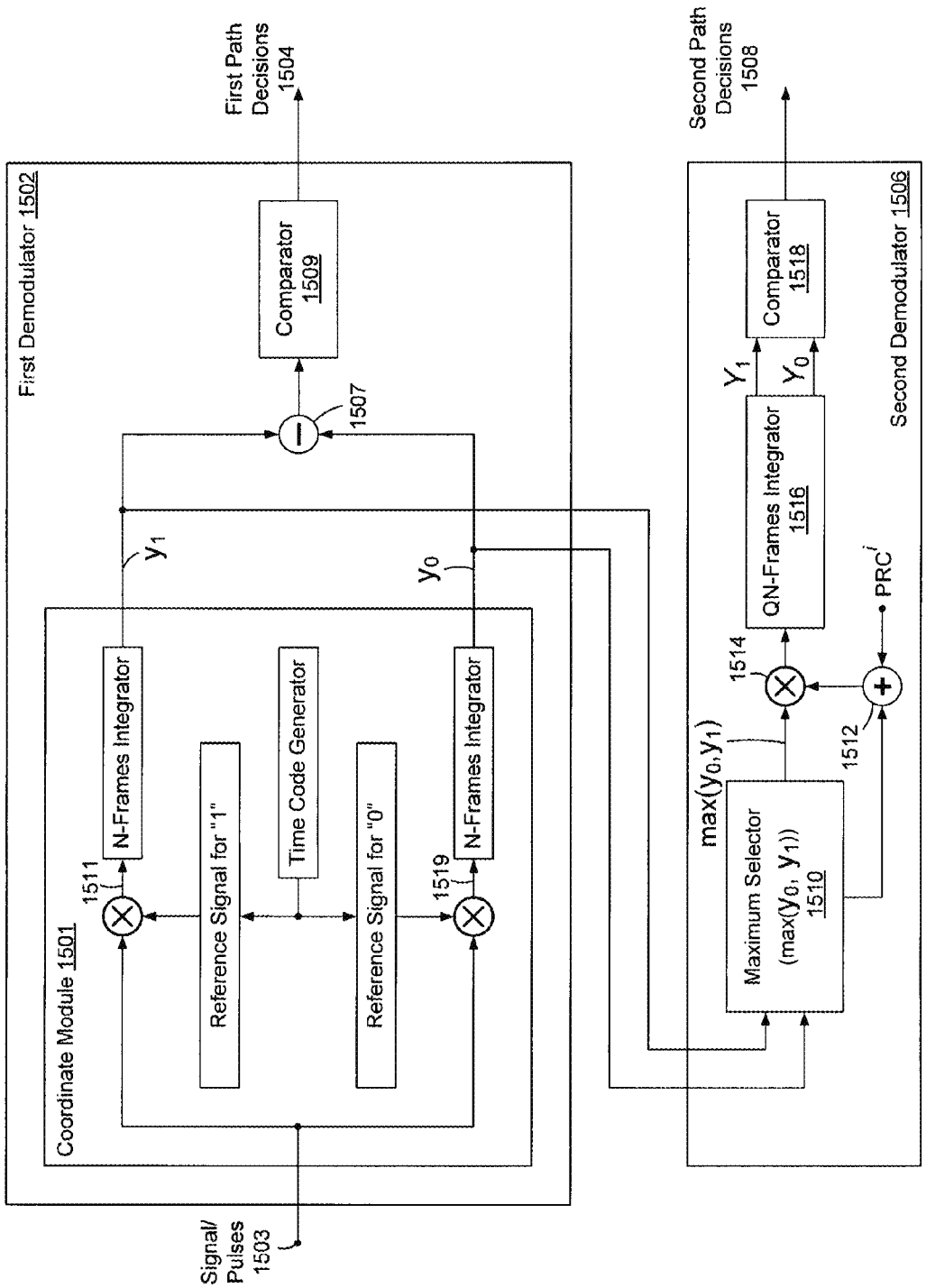
FIG. 15 is a block diagram of a multi-bit-stream demodulator system.

FIG. 15 is a block diagram of a multi-bit-stream demodulator system, including a first demodulator 1502 to generate first path decisions 1504 regarding input bits 807 of first bit path 806 in FIG. 8, and a second demodulator 1506 to generate second path decisions 1508 regarding input bits 809 of second bit path 808 in FIG. 8. First and second demodulators 1502 and 1506 may also be referred to as demodulator paths and/or demodulator streams.

First demodulator 1502 includes a coordinate module 1501 to determine axis coordinates 1511 and 1519 for pulses 1503, and to integrate axis coordinates 1511 and 1519 over a window of N frames to provide corresponding axis coordinate sets $\{y_1, y_0\}$, such as described above with reference to FIG. 3.

Figure 16:
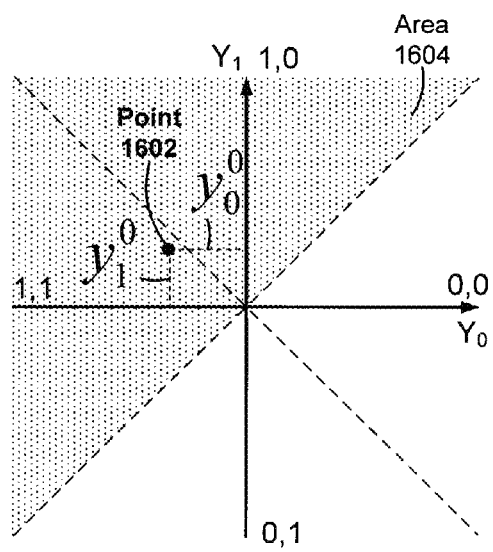
FIG. 16 is a graph of a point in a {y1, y0} coordinate system to illustrate demodulation of a first path bit value.
Figure 17:
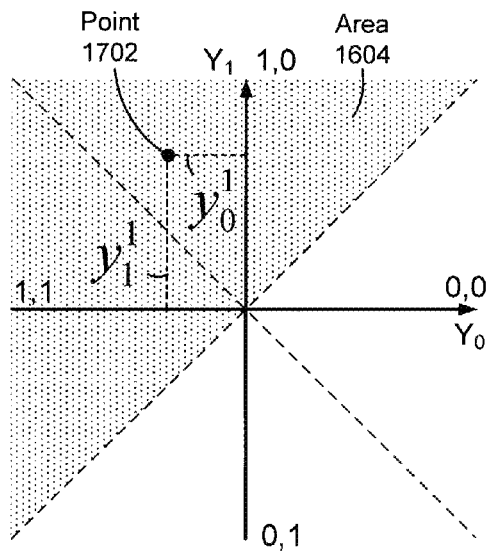
FIG. 17 is a graph of another point in the {y1, y0} coordinate system to illustrate demodulation of another first path bit value.
Figure 18:
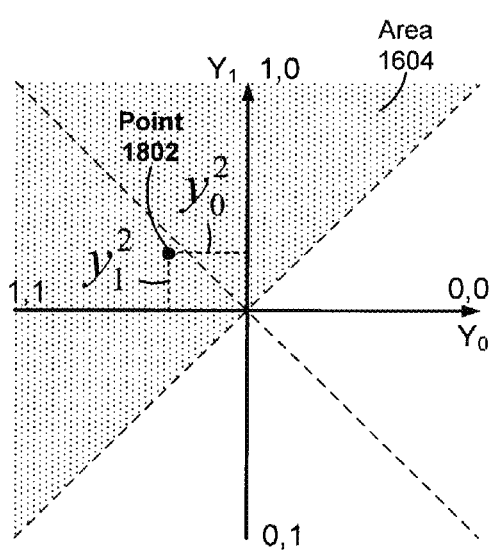
FIG. 18 is a graph of another point in the {y1, y0} coordinate system to illustrate demodulation of another first path bit value.

First demodulator 1502 may determine first path decisions 1504 based on the integrated axis coordinates of FIGS. 16, 17, and 18. For example, with reference to FIGS. 10 through 12, first demodulator 1502 may generate a first set of $\{y_1, y_0\}$ coordinates based on transmit frames 1 through 3, a second set of $\{y_1, y_0\}$ coordinates based on transmit frames 4 through 6, and first path decisions 1504 for bits b1 and b2 of FIG. 10 based on the corresponding $\{y_1, y_0\}$ coordinates.

Example axis coordinate sets $\{y_1, y_0\}$ illustrated in FIGS. 16 through 18.

FIG. 16 is a graph of a point 1602 in a $\{y_1, y_0\}$ coordinate system.

FIG. 17 is a graph of a point 1702 in the $\{y_1, y_0\}$ coordinate system.

FIG. 18 is a graph of a point 1802 in the $\{y_1, y_0\}$ coordinate system.

For input bits 807 of first bit path 806, a point within a shaded area 1604 corresponds to logic value 1, and a point outside of shaded area 1604 corresponds to logic value 0. In the example of FIGS. 16 through 18, each of points 1602, 1702, and 1802 lie within shaded area 1604 and thus represent logic values of 1.

Second demodulator 1506 may generate second path decisions 1508 based on the integrated $\{y_1, y_0\}$ coordinates generated by coordinate module 1501, such as described below with reference to EQS. (5) through (8) and FIGS. 16 through 19.

$$Y_0 = \sum_{i=1}^{Q} (-1)^{PRC^i} y_0^i b_0^j \qquad \text{EQ. (5)}$$

$$Y_1 = \sum_{i=1}^{Q} (-1)^{PRC^i} y_1^i b_1^j \qquad \text{EQ. (6)}$$

In EQS. (5) and (6):

if $|y_0^i| > |y_1^i|$, then $b_0^i = 1$ and $b_1^i = 0$; and  EQ. (7)

if $|y_1^i| > |y_0^i|$, then $b_0^i = 0$ and $b_1^i = 1$.  EQ. (8)

EQS. (5) through (8) are described below with reference to FIGS. 16 through 19.

For the example of FIG. 16, $|y_0^0| > |y_1^0|$, so $b_0^0 = 1$ and $b_1^0 = 0$.

For the example of FIG. 17, $|y_1^1| > |y_1^1|$, so $b_0^1 = 0$ and $b_1^1 = 1$.

For the example of FIG. 18, $|y_0^2| > |y_1^2|$, so $b_0^2 = 1$ and $b_1^2 = 0$.

Figure 19:
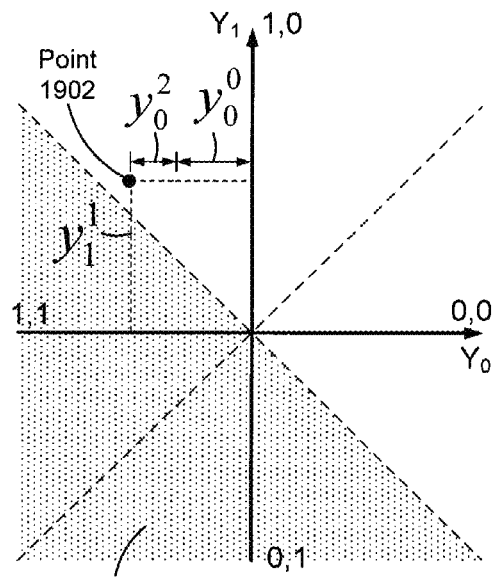
FIG. 19 is a graph of a point in the {y1, y0} coordinate system, having coordinates based on an integration of selected axis coordinates of the points of FIGS. 16, 17, and 18, to illustrate demodulation of a second path bit value.

FIG. 19 is a graph in which the $\{y_1, y_0\}$ coordinates of points 1602, 1702, and 1802 are mapped to a point 1902 based on EQS. (5) through (8). In FIG. 19, the $Y_0$ coordinate is determined as a sum of $y_0^0$ of FIG. 16 and N of FIG. 17, and $Y_1$ coordinate is equal to $y_1^2$ of FIG. 18.

For input bits 809 of second bit path 808 in FIG. 8, a point within a shaded area 1904 corresponds to logic value 1, and a point outside of shaded area 1904 corresponds to logic value 0. Point 1902 lies outside of area 1804, and thus corresponds to an input bit 809 of second bit path 808 equal to 0.

In FIG. 15, second demodulator 1506 includes a maximum selector 1510 to output the larger of $y_0^i$ and $y_1^i$ for each set of $\{y_1, y_0\}$.

Second demodulator 1506 further includes summer 1512 to apply an inverse of the Q-bit code applied by encoder 814, illustrated here as $PRC^i$, to the selected $y_1$ or $y_0$ coordinate. This effectively removes the Q-bit encoding.

Second demodulator 1506 further includes a multiplier 1514 to compute $y_0^{i}*(-1)^{PRC^i}$ or $y_1^{i}*(-1)^{PRC^i}$ for the selected coordinate.

Second demodulator 1506 further includes an integrator 1516 to accumulate outputs of multiplier 1514 over a moving window of Q*N frames.

In FIG. 19, the $\{Y_1, Y_0\}$ coordinates of point 1902 in FIG. 2 represent outputs of integrator 1515.

Second demodulator 1506 further includes a comparator 1518 to generate second path decisions 1508 based on outputs of integrator 1516.

Second demodulator 1506 may operate at a lower frequency than coordinate module 1501, and may be implemented with relatively little or no increase in receiver complexity.

Parameters described herein may be selected and/or optimized based on one or more of a variety of factors, and may be selected and/or optimized based on computer simulations. For example, parameters M (number of slots per transmit frame), N (PN code length of first bit path 806), and/or Q (PN code length of second bit path 808), may be selected and/or optimized to maximize a data rate without exceeding a specified error rate (BER).

The data rate may be expressed as:

$$R_b = \frac{Q+1}{QMN} \text{ bits per second.} \qquad \text{EQ. (9)}$$

Example data rates are provided in Tables 2 through 4 below for a BER<$10^{-3}$. Tables 2 through 4 correspond to wireless chip area networks of 4, 8, and 8 transmitters, respectively.

TABLE 2

K = 4

|  | M | N | Q | $R_b$ |
|---|---|---|---|---|
| PN (N, 1) Encoding | 1 | 11 | — | 0.090 |
| PN (N, 1) Encoding, with PN (Q, 1) Encoding and Repetition Encoding | 3 | 4 | 3 | 0.111 |

TABLE 3

| K = 8 | | | | |
| --- | --- | --- | --- | --- |
| | M | N | Q | $R_b$ |
| PN (N, 1) Encoding | 1 | 23 | — | 0.043 |
| PN (N, 1) Encoding with PN (Q, 1) Encoding, and Repetition Encoding | 5 | 5 | 3 | 0.053 |

TABLE 4

| K = 8 | | | | |
| --- | --- | --- | --- | --- |
| | M | N | Q | $R_b$ |
| PN (N, 1) Encoding | 1 | 43 | — | 0.023 |
| PN (N, 1) Encoding, PN (Q, 1) Encoding, and Repetition Encoding | 8 | 6 | 3 | 0.028 |

In the examples of Tables 2 through 4, a transmitter that implements PN (N,1) encoding, PN (Q,1) encoding, and repetition encoding, provides approximately 23% greater gain relative to a transmitter that provides only PN (N,1) encoding. Methods and systems disclosed herein are not, however, limited to these examples.

Methods and systems disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, and/or a combination of integrated circuit packages. Software may include a computer readable medium encoded with a computer program including instructions to cause a processor to perform one or more functions in response thereto. The computer readable medium may include a transitory and/or non-transitory medium. The processor may include a general purpose instruction processor, a controller, a microcontroller, and/or other instruction-based processor.

Figure 20:
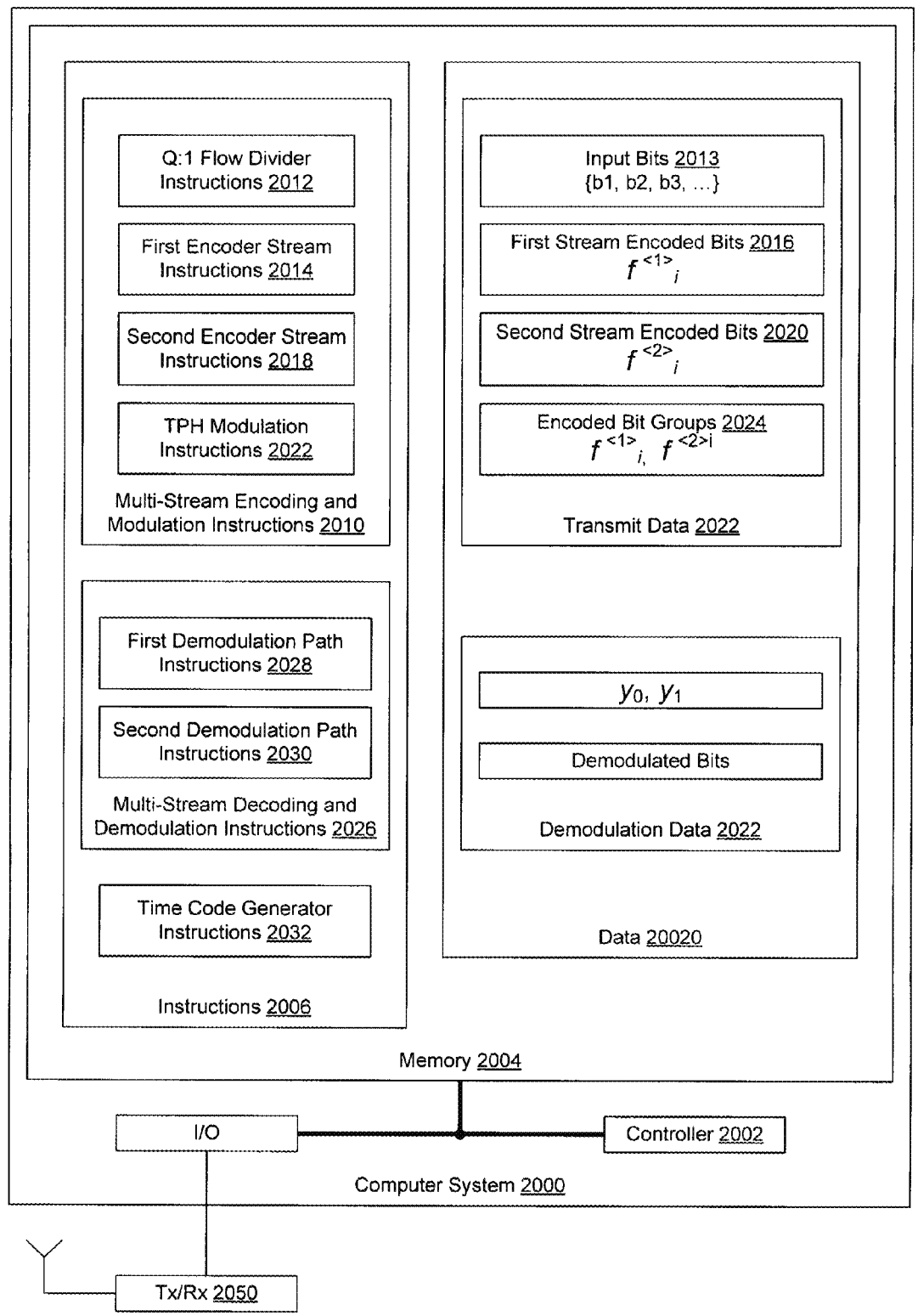
FIG. 20 is a block diagram of a computer system to implement multi-bit-stream modulation and demodulation.

FIG. 20 is a block diagram of a computer system 2000 to implement multi-bit-stream modulation and demodulation.

Computer system 2000 may be implemented within an integrated circuit (IC) chip to communicate within a wireless chip area network.

Computer system 2000 may include one or more instruction processors and/or processor cores, illustrated here as a controller 2002, to execute computer readable instructions, also referred to herein as computer program logic.

Computer system 2000 may include memory, cache, registers, firmware, and/or storage, illustrated here as memory 2004.

Memory 2004 may include a computer readable medium encoded with a computer program, illustrated here as instructions 2006. The computer readable medium may include a non-transitory medium.

Memory 2004 may include data 2008 to be used by controller 2002 to execute instructions 2006, and/or generated by controller 2002 during execution of instructions 2006.

In FIG. 20, instructions 2006 include multi-stream encoding and modulation (modulation) instructions 2010, and multi-stream decoding and demodulation (demodulation) instructions 2026.

Modulation instructions 2010 include Q:1 flow divider instructions 2014 to cause controller 2002 to apportion or divide input bits 2013 amongst first and second bit paths or bit streams.

Modulation instructions 2010 further include first encoder stream instructions 2014 to cause controller 2002 to encode first bit stream bits with N-bit codes, such as N-bit PN codes, to generate a first sequence or stream of encoded bits 2016.

Modulation instructions 2010 further include second encoder stream instructions 2018 to cause controller 2002 to encode second bit stream bits to provide a second sequence or stream of encoded bits 2020 having a 1:1 correlation with first stream of encoded bits 2016.

Second encoder stream instructions 2018 may include instructions to cause controller 2002 to encode second bit stream bits with Q-bit codes, such as Q-bit PN codes, and to repetition encode results of the Q-bit encoding.

Modulation instructions 2010 further include time-phase-hopping (TPH) modulation instructions 2022 to cause controller 2002 and/or a transceiver system 2050 to modulate groups 2024 (e.g., pairs) of encoded bits 2016 and 2020 as a sequence of corresponding pulses having positions and phases based on binary values of the corresponding bit groups.

Demodulation instructions 2026 include first demodulation path instructions 2028 to cause controller 2002 to remove N-bit encoding of the received pulses, compute decoded coordinates of the received pulses, and determine bit values from pulse coordinates integrated over N frames, such as described in one or more examples above.

Demodulation instructions 2026 further include second demodulation path instructions 2030 to cause controller 2002 to remove Q-bit encoding of the integrated coordinates, and to determine bit values based on selected portions of the integrated coordinates, further integrated over Q*N frames, such as described in one or more examples above.

Instructions 2006 may include time code generator instructions 2032 to cause controller 2002 to generate timing controls and/or sequences of pseudo-random numbers for modulation instructions 2010 and/or demodulation instructions 2032.

Methods and systems disclosed herein may be implemented with respect to one or more of a variety of systems, such as described below with reference to FIG. 21. Methods and systems disclosed herein are not, however, limited to the example of FIG. 21.

Figure 21:
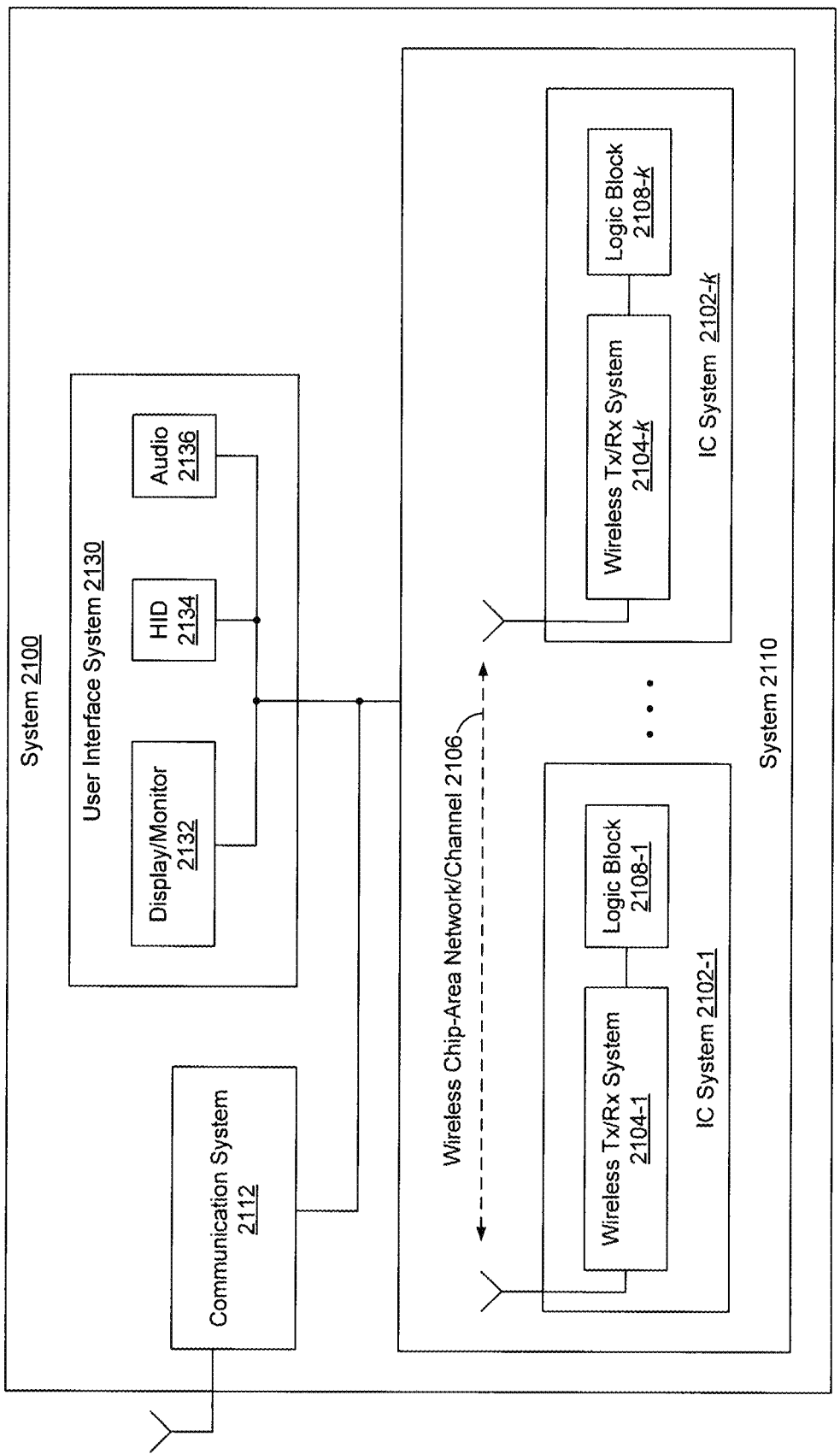
FIG. 21 is a block diagram of a system including multiple integrated circuit (IC) systems, each including a multi-bit stream wireless communication system to communicate over a wireless channel, such as an inter-chip and/or intra-chip wireless chip area network (WCAN).

FIG. 21 is a block diagram of a system 2100 including multiple integrated circuit (IC) systems 2102, each including a multi-bit stream wireless communication system 2104 to communicate over a wireless channel, illustrated here as an inter-chip and/or intra-chip wireless chip area network (WCAN) 2106.

Communication systems 2104 may be implemented to encode and modulate data with multi-stream encoding and time-phase-hopping modulation, and/or to decode and demodulate data with multi-stream decoding and time-phase-hopping demodulation, such as described in one or more examples herein.

Each IC system 2102 may include a corresponding logic block 2108 to provide data to and/or receive data from the corresponding communication system. Logic blocks 2108 may include logic, a processor or processor core, and/or other systems/devices.

System 210 may further include a communication system 2112 and/or a user interface system 2130.

Communication system 2112 may be implemented to communicate between a network and user interface system 2130 and/or between the network and system 2110. Communication system 2112 may be implemented to communicate by wire and/or wirelessly with the network, system 2110, and/or user interface system 2130.

User interface system 2130 may include a monitor or display 2132 to display information from system 2110.

User interface system 2130 may include a human interface device (HID) 2134 to provide user input to system 2110 and/or communication system 2112. HID 2134 may include, for example and without limitation, one or more of a keyboard, a cursor device, a touch-sensitive device, and or a motion and/or image sensor. HID 2134 may include a physical device and/or a virtual device, such as a monitor-displayed or virtual keyboard.

User interface system 2130 may include an audio system 2136, which may include a microphone and/or a speaker to generate audible sound from communication system 2112 and/or system 2110.

System 2100 may correspond to, for example and without limitation, a computer system, a personal communication device, and/or a television set-top box.

System 2100 may include a housing, and one or more of system 2110, communication system 2112, user interface system 2130, or portions thereof, may be positioned within the housing. The housing may include, without limitation, a rack-mountable housing, a desk-top housing, a lap-top housing, a notebook housing, a net-book housing, computer tablet housing, a set-top box housing, a portable housing such as a mobile telephone housing, and/or other conventional electronic housing and/or future-developed housing.

As disclosed herein, a system may include a modulator system to combine multiple bit streams as a sequence of pulses having modulated positions and phases. The modulator system may include first and second modulator bit paths, an N bit repetition encoder to provide the second modulator bit path with an output bit rate equal to an output bit rate of the first modulator bit path, where N is greater than 1. The modulator system may further include a modulator to group outputs bits of the first and second modulator bit paths and modulate the bit groups as a sequence of pulses, including to modulate positions and phases of the pulses based on binary values of the corresponding bit groups with no more than one phase change per N pulses.

The modulator system may be implemented to pair the output bits of the first and second modulator bit paths, and modulate the bit pairs as the sequence of pulses.

The modulator system may be implemented to modulate pulse positions based on output bit values of the first modulator bit path, and to modulate pulse phases based on output bit values of the second modulator bit path.

The modulator system may be implemented such that:
an input bit rate of the first modulator bit path is Q times an input bit rate of the second modulator bit path, where Q is a positive number;
the first modulator bit path includes an N-bit pseudo-random encoder to encode bits of the first modulator bit path with N-bit pseudo-random sequences; and
the second modulator bit path includes a Q-bit pseudo-random encoder to encode bits of the second modulator bit path with Q-bit pseudo-random sequences.

The modulator system may be implemented for Q greater than 0, and may be implemented for Q greater than 1.

As further disclosed herein, a system may include a demodulator system to demodulate multiple bit streams from a sequence of position and phase modulated pulses may include first and second demodulator paths.

The first demodulator path may be implemented to compute sets of first and second axis-coordinates from the pulses, integrate the first and second axis coordinates over N transmit frames to generate corresponding sets of first and second integrated axis coordinates, where N is greater than 1, and determine a first sequence of bit values from the sets of integrated axis coordinates based on differences between the corresponding first and second integrated axis coordinates.

The second demodulator path may be implemented to select a maximum one of the first and second integrated axis coordinates from the sets of integrated axis coordinates, integrate the selected axis coordinates over Q sets over Q*N transmit frames, where Q is greater than 0, and determine a second sequence of bit values based on the integrated selected axis coordinates.

The demodulator system may be implemented for Q greater than 0, and may be implemented for Q greater than 1.

The first demodulator path may be implemented to remove N-bid codes from the axis coordinates of the pulses, and the second demodulator path may be implemented to remove Q-bit codes from the selected integrated axis coordinates.

The first demodulator path may be implemented to determine position-modulated bit values, and the second demodulator path may be implemented to determine phase-modulated bit values.

A modulator system and/or a demodulator system as described in one or more examples above may be implemented within an integrated circuit (IC) module, and may be implemented to communicate with one or more other IC modules over a wireless inter-chip area network (WCAN).

As further disclosed herein, a transceiver system may include a logic block and a transceiver a transceiver to modulate and demodulate first and second sequences of bits within corresponding transmit and receive sequences of pulses, wherein each pulse represents at least one bit of each of the first and second sequences of bits, and each pulse is position-modulated and phase-modulated based on binary values of the corresponding bits with no more than 1 phase change per N pulses, where N is greater than 1. The logic block may include a processor.

The transceiver system may include a modulator system and/or a demodulator system as described in one or more examples above, and may be implemented within an IC module as describe above.

An IC based transceiver system may include a user interface system and a housing, and the IC module and at least a portion of the user interface system may be positioned within the housing.

The IC based transceiver system may further include a communication system to wirelessly communicate with a communication network and to interface with one or more of the logic block and the user interface system.

The IC based transceiver system may further include a battery to provide power to the IC module, the communication system, and the user interface system.

The IC module, the communication system, the battery, and at least a portion of the user interface system may be positioned within the housing.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein.

Thus, the breadth and scope of the claims should not be limited by any of the example embodiments disclosed herein.

What is claimed is:

1. An apparatus, comprising a transmitter that includes:
a flow divider to apportion bits of a bit stream amongst first and second bit paths to provide the first bit path with an input bit rate that is greater than an input bit rate of the second bit path;
an N bit repetition encoder to provide the second bit path with an output bit rate equal to an output bit rate of the first bit path, where N is greater than 1; and
a modulator to group outputs bits of the first and second bit paths and modulate a stream of pulses in phase and frame position based on binary values of the bit groups to provide a stream of modulated pulses with no more than one phase change per N pulses.

2. The apparatus of claim 1, wherein the modulator is configured to pair the output bits of the first and second bit paths, and modulate the stream of pulses based on binary values of the bit pairs as the sequence of pulses.

3. The apparatus of claim 1, wherein the modulator is configured to position modulate the pulses based on output bit values of the first bit path, and to phase modulate the pulses based on output bit values of the second bit path.

4. The apparatus of claim 1, wherein:
the flow divider is configured to provide Q bits to the first bit path for each bit provided to the second bit path, where Q is a positive number;
the first bit path includes an N-bit pseudo-random encoder to encode bits of the first bit path with N-bit pseudo-random sequences; and
the second bit path includes a Q-bit pseudo-random encoder to encode bits of the second bit path with Q-bit pseudo-random sequences.

5. The apparatus of claim 4, where Q is greater than 1.

6. The apparatus of claim 4, further including a receiver to demodulate first and second bit streams from a stream of pulses that are modulated in phase and frame position, wherein the receiver includes:
a first demodulator path to compute first and second axis coordinates the stream of pulse, integrate the first axis coordinates and the second axis coordinates, each over a window of N transmit frames to provide sets of integrated axis coordinates, and determine first bit stream values based on the sets of integrated axis coordinates; and
a second demodulator path to select maximum coordinates from the sets of integrated axis coordinates, integrate the selected coordinates over a window of Q*N transmit frames, and determine second bit stream values based on the selected coordinates integrated over the window of Q*N transmit frames.

7. The apparatus of claim 6, wherein Q is greater than 1.

8. The apparatus of claim 7, wherein:
the first demodulator path is configured to remove N-bit codes from the axis coordinates of the pulses; and
the second demodulator path is configured to remove Q-bit codes from the selected integrated axis coordinates.

9. The apparatus of claim 6, wherein:
the first demodulator path is configured to determine position-modulated bit values; and
the second demodulator path is configured to determine phase-modulated bit values.

10. The apparatus claim 1, wherein the transmitter is configured within a first integrated circuit device to communicate with one or more other integrated circuit devices over a wireless chip network.

11. An apparatus, comprising integrated circuitry that includes a logic block and a transceiver to communicate between the logic block and one or more other logic blocks over a wireless chip area network, wherein the transceiver includes:
a transmitter to apportion bits of a bit stream unevenly amongst first and second bit paths, repetition encode one of the first and second bit paths with an N-bit repetition code to provide the first and second bit paths with equal output bit rates, where N is greater than 1; and
modulate pulses of a pulse stream in frame position based on output bit values of the first bit path and in phase based on output bit values of the second bit path with no more than one phase change per N pulses.

12. The apparatus of claim 11, wherein the transmitter includes:
a flow divider to provide Q bits to the first bit path for each bit provided to the second bit path, where Q is a positive number;
an N-bit pseudo-random encoder to encode bits of the first bit path with N-bit pseudo-random sequences;
an N-bit repetition encoder to repetition encode bits of the second bit path; and
a Q-bit pseudo-random encoder to encode bits of the second bit path with Q-bit pseudo-random sequences.

13. The apparatus of claim 12, wherein the transceiver further includes a receiver to demodulate first and second bit streams from a stream of pulses that are modulated in phase and frame position, wherein the receiver includes:
a first demodulator path to compute first and second axis coordinates the stream of pulse, integrate the first axis coordinates and the second axis coordinates, each over a window of N transmit frames to provide sets of integrated axis coordinates, and determine first bit stream values based on the sets of integrated axis coordinates; and
a second demodulator path to select maximum coordinates from the sets of integrated axis coordinates, integrate the selected coordinates over a window of Q*N transmit frames, and determine second bit stream values based on the selected coordinates integrated over the window of Q*N transmit frames.

14. A system, comprising integrated circuitry that includes:
a processor and memory;
a user interface system;
a communication system to communicate between a network and one or more of the processor and the user interface system; and
first and second transceivers to communicate between respective first and second first logic blocks of the integrated circuitry over a wireless chip area network;
wherein each of the first and second transceivers includes a transmitter to apportion bits of a bit stream unevenly amongst first and second bit paths, repetition encode one of the first and second bit paths with an N-bit repetition code to provide the first and second bit paths with equal output bit rates, where N is greater than 1; and
modulate pulses of a pulse stream in frame position based on output bit values of the first bit path and in phase based on output bit values of the second bit path with no more than one phase change per N pulses.

15. The apparatus of claim 14, wherein the transmitter includes:
a flow divider to provide Q bits to the first bit path for each bit provided to the second bit path, where Q is a positive number;

an N-bit pseudo-random encoder to encode bits of the first bit path with N-bit pseudo-random sequences;

an N-bit repetition encoder to repetition encode bits of the second bit path; and a Q-bit pseudo-random encoder to encode bits of the second bit path with Q-bit pseudo-random sequences.

16. The apparatus of claim 15, wherein the transceiver further includes a receiver to demodulate first and second bit streams from a stream of pulses that are modulated in phase and frame position, wherein the receiver includes:

a first demodulator path to compute first and second axis coordinates the stream of pulse, integrate the first axis coordinates and the second axis coordinates, each over a window of N transmit frames to provide sets of integrated axis coordinates, and determine first bit stream values based on the sets of integrated axis coordinates; and a second demodulator path to select maximum coordinates from the sets of integrated axis coordinates, integrate the selected coordinates over a window of Q*N transmit frames, and determine second bit stream values based on the selected coordinates integrated over the window of Q*N transmit frames.

* * * * *